Oct. 28, 1947.   R. J. VIOLETTE ET AL   2,429,654
STUFFING BOX
Filed July 18, 1944
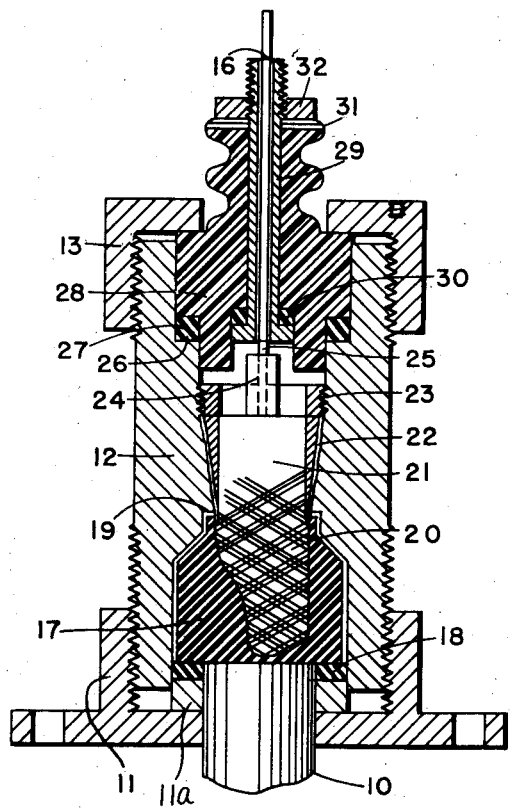
Inventor
RICHARD J. VIOLETTE
IRVING H. PAGE
By W. Glenn Jones
Attorney

UNITED STATES PATENT OFFICE 2,429,654

STUFFING BOX

Richard J. Violette, Washington, D. C., and
Irving H. Page, Cheverly, Md.

Application July 18, 1944, Serial No. 545,532

6 Claims. (Cl. 174—75)

(Granted under the act of March 3, 1883, as
amended April 30, 1928; 370 O. G. 757)

Our invention relates to improved stuffing boxes for use with conduits. In particular it relates to improved stuffing boxes and the method of using them on electrical cables or other conduits, which are subjected to extremely severe atmospheric or hydraulic pressures.

Recently it has become necessary to make installations in submarines which require the passage of cables through the outer pressure hull of the vessel. Such procedure requires that the joint at the hull be capable of withstanding extremely exacting pressure conditions for some modern submarines can submerge to a depth of 300 feet, which corresponds to a pressure of about 150 pounds per square inch. When it is realized that a cable joint in the hull may cover several square inches in area, the total force exerted on the joint is tremendous at such great depths.

In early installations, the cable, usually ordinary armored or unarmored coaxial cable, was passed through a tightly packed conventional stuffing box with the fervent hope that the joint could withstand the force. It was found in all cases that the cable slipped to a considerable extent and the joint leaked. In a few deep dives, the cable was actually forced back into the submarine. Thus, it became obvious that for safe operation of the necessary equipment in tactical submarine warfare a reliable stuffing box was necessary.

Generally on board ship, both warships and merchant ships, a considerable degree of compartmentation is carried out in order to be able to ward off sinking in case of damage to the hull. Since such compartmentation calls for maintenance of a high degree of water tight integrity throughout the ship, great care must be expended in construction details. In passing cables, wires, tubes, pipes or conduits of any sort through a bulkhead it is imperative that the joint be made waterproof and, to a considerable degree, shockproof.

It is the principal object of our invention to provide an improved stuffing box for use in making extreme pressure, watertight, and shock proof joints.

It is a second object of our invention to provide a method of passing a conduit through a barrier subject to extremely high pressures or shocks in a manner such that the conduit will not slip and the joint will not leak.

It is a third object of our invention to provide not only a pressure tight joint for passing an electrical conduit but also one giving a good impedance match when the conduit is used for carrying ultra high frequency currents through a bulkhead and the bulkhead serves as a ground connection.

Other objects and advantages of our invention will in part be obvious and in part appear hereinafter.

The invention accordingly comprises the several steps and the relation of one or more of such steps with respect to each of the others and the device embodying the features of construction combinations and arrangement of parts, adapted to effect such steps all as exemplified in the detailed disclosure hereinafter set forth and the scope of the invention will be indicated in the claims.

For a fuller understanding of the nature and objects of the invention reference should be had to the following detailed description taken in conjunction with the accompanying drawing.

The drawing is an axial section of a preferred embodiment of the invention.

Referring to the drawing in detail, on the jacket 12 of the cable 10 there is molded integrally with the jacket and passing peripherally around it a collar 17 of such a shape that it will substantially fill the corresponding cavity of the stuffing box jacket 12. For a firm tight fit, a compressible gasket 18 of a material such as rubber can be slipped around the cable under the collar 17 to permit jacket 12 to be tightened.

Immediately above the end of the collar 17, the outer insulation of cable 10 is terminated so as to permit the inner shoulder 19 of jacket 12 to seat against the end of the insulation forming the cable jacket.

The outer conductor of the coaxial line shown as braided conductor 20 is forced into close electrical contact with the jacket 12 of the stuffing box and thus grounded by forcing between it and the inner dielectric 21 of the cable a conducting wedge-shaped ring 22. Externally threaded collar 23 is used to seat ring 22. A substantially perfect impedance match is obtained at this point by making the internal diameters of ring 22 and collar 23 the same as the outer diameter of the dielectric 21. In other words the characteristic impedance of the line is not changed and as a result no electrical hump occurs in the line by grounding at this point. The dielectric 21 of the cable is terminated at about the point to which the threads for ring 23 extend. The inner conductor 24 is extended beyond the termination of the dielectric 21 and drilled to accommodate a wire 25, which is fastened into the hole as indicated in Fig. 2. A shoulder 26 in the jacket 12 of the stuffing box accommodates a compressible ring 27, which in turn accommodates the insulating head 28 of a firmer yet compressible material such as the plastic polyethylene. Over the wire 25, and before putting in place head 28, there is slipped a flanged tubular member 29, which is a conductor threaded at its upper end. The flanged member is made to accept a compressible gasket 30 of rubber or the like which, when head 28 is put in place, fits between flanged conductor 29 and head 28. To complete the joint compressible washers 31 are slipped into place and the assembly clamped by nut 32. The space between conductor 25 and member 29 is sealed with solder to perfect the electrical connection and watertight nature of the joint.

From the above detailed description, the operation of our novel stuffing box and construction of our novel joint should be apparent. When all parts are in place the pressure of water or air on the joint tends to improve the watertight integrity of the joint by forcing parts into closer contact with one another. It can be seen from the drawing that when clamping nut 32 is drawn tight gasket 30 is compressed and compressible head 28 is forced radially outwardly into tighter engagement with jacket 12. When cap 13 is tightened the compressible ring 27 is compressed to force it downwardly against the shoulder 26 and radially outwardly against the jacket 12.

The method and apparatus of our invention need not be restricted to passing coaxial cable through bulkheads in a manner such as to maintain watertight integrity but can be used fully as well for passage of single or multiple conductor cables through bulkheads with little modification of the end seal. Likewise the method and apparatus can be readily adapted to making superior type joints wherever a conduit or cylindrical member must pass through a wall. All that is necessary is to form integrally on the outer surface of the conduit a collar which can be clamped by our improved stuffing box and then matching the conduit to the load at its end.

Although the drawings illustrate only the embodiment of the invention in which coaxial cable is passed through a bulkhead, one conductor grounded and the other carried through, the modifications necessary to use the stuffing box with single conductor cable are evident. If single conductor cable is used, the wedge and ground connection shown as 22 in the drawing become unnecessary and the collar is molded directly onto the insulation of the cable.

Our invention is of great value and finds wide application in the laying of cable as shown in copending application Serial Number 545,533 filed July 18, 1944, by Richard J. Violette.

Since certain changes may be made in carrying out the above method of making the joint and in the joint itself, and modifications effected in the stuffing box and associated parts for practicing the principle thereof, without departing from the scope of the invention, it is intended that all matter contained in the above description or shown in the accompanying drawings shall be interpreted as illustrative and not in a limiting sense.

The invention described herein may be manufactured and used by or for the Government of the United States of America for governmental purposes without the payment of any royalties thereon or therefor.

1. In a stuffing box for cable, inner and outer engageable tubular members, said inner member having within it a cavity one part of which is adapted to fit closely over a peripheral collar on the outer jacket of cable to be passed through said stuffing box in order to grip the said peripheral collar between the tubular members, means for leading the conductor out of the stuffing box in pressure proof manner comprising a flanged tubular conducting member for receiving the conductor of the cable, a compressible head fitting over said flanged tubular member engageable between said flange and a nut on the opposite end of said flanged member, a cap engaging the free end of said inner tubular member and said compressible head to compress said head into the end of the cavity in the inner tubular member.

2. In a stuffing box for cable, inner and outer engageable tubular members, said inner member having a cavity within it one end of which is adapted to fit closely over a collar on the outer jacket of cable to be passed through said stuffing box, a compressible ring lying between said inner and outer tubular members said ring having an outside diameter corresponding substantially to the inside diameter of said cavity and an inside diameter corresponding to the outside diameter of the cable to be passed therethrough, means for extending the conductor out of the box in pressure-proof fashion comprising a flanged second tubular conducting member capable of passing the cable conductor through its longitudinal tube, a compressible head adapted to fit into the other end of the cavity in the inner tubular member and permit passage therethrough of said flanged tubular member, a nut engageable with the protruding end of said flanged tubular member to compress between it and the flanged end of said tubular member the compressible head, a cap engaging the free end of said inner tubular member and said compressible head to compress it into the end of the cavity in the inner tubular member.

3. In a stuffing box for coaxial cable, inner and outer engageable tubular members, said inner member having within it a cavity one part of which is adapted to fit closely over a collar extending peripherally around the cable to be passed therethrough in order to grip the collar between the inner and outer tubular members, means for terminating the outer conductor of the coaxial cable within the stuffing box comprising a wedge adapted to be forced between said outer conductor and the dielectric between the outer conductor and inner conductor to force the outer conductor against the inner tubular member of the stuffing box, means for leading the inner conductor out of the stuffing box in pressure-proof manner comprising a flanged tubular conducting member for receiving the inner conductor of the cable, a compressible head fitting over said flanged tubular member and engageable between said flange and a nut on the opposite end of said flanged member, a cap engaging the free end of said inner tubular member and said compressible head to compress it into the end of the cavity in the inner tubular member.

4. In a stuffing box for conduits, inner and outer engageable tubular members, said inner member having within it a cavity one part of which is adapted to fit closely over a collar integrally joined to the conduit to be passed through said stuffing box in order to grip the collar between the tubular members, means for leading the conduit out of the stuffing box comprising a compressible head engageable between the stuffing box cap and said inner tubular member to seal the end of the stuffing box.

5. A cable seal comprising a collar passing peripherally around the cable and forming an integral part thereof said collar being closely engageable within a stuffing box comprising inner and outer engageable tubular members, said inner member having within it a cavity one part of which is adapted to fit closely over a peripheral collar on the outer jacket of cable to be passed through said stuffing box in order to grip the said peripheral collar between the tubular members, means for leading the conductor out of the stuffing box in pressure proof manner comprising a flanged tubular conducting member for receiving the conductor of the cable, a compressible head fitting over said flanged tubular member engageable between said flange and a nut on the opposite end of said flanged member, a cap engaging the free end of said inner tubular member and said compressible head to compress said head into the end of the cavity in the inner tubular member.

6. A cable joint comprising in combination a collar passing peripherally around the cable and forming an integral part thereof and a stuffing box closely engageable with said collar said stuffing box comprising inner and outer engageable tubular members, said inner member having a cavity within it one end of which is adapted to fit closely over a collar on the outer jacket of cable to be passed through said stuffing box, a compressible ring lying between said inner and outer tubular members said ring having an outside diameter corresponding substantially to the inside diameter of said cavity and an inside diameter corresponding to the outside diameter of the cable to be passed therethrough, means for extending the conductor out of the box in pressure-proof fashion comprising a flanged second tubular conducting member capable of passing the cable conductor through its longitudinal tube, a compressible head adapted to fit into the other end of the cavity in the inner tubular member and permit passage therethrough of said flanged tubular member, a nut engageable with the protruding end of said flanged tubular member to compress between it and the flanged end of said tubular member the compressible head, a cap engaging the free end of said inner tubular member and said compressible head to compress it into the end of the cavity in the inner tubular member.

RICHARD J. VIOLETTE.
IRVING H. PAGE.

REFERENCES CITED

The following references are of record in the file of this patent:

UNITED STATES PATENTS

| Number | Name | Date |
| --- | --- | --- |
| 2,269,194 | Finlayson | Jan. 6, 1942 |
| 1,768,522 | Brown | June 24, 1930 |
| 1,497,002 | Sanderson | June 10, 1924 |
| 1,130,483 | Davis | Mar. 2, 1915 |
| 2,368,923 | Hampton | Feb. 6, 1945 |
| 2,315,623 | Jacobi | Apr. 6, 1943 |
| 2,352,159 | Brodie | June 27, 1944 |
| 2,177,508 | Abbott | Oct. 24, 1939 |